United States Patent
Rukavina et al.

[11] Patent Number: 5,840,429
[45] Date of Patent: Nov. 24, 1998

[54] AIRCRAFT TRANSPARENCY

[75] Inventors: Thomas G. Rukavina, Verona; Robert M. Hunia, Kittanning, both of Pa.

[73] Assignee: PPG Industries, Inc., Pittsburgh, Pa.

[21] Appl. No.: 743,867

[22] Filed: Nov. 5, 1996

[51] Int. Cl.⁶ .................................................. B32B 27/30
[52] U.S. Cl. .................. 428/412; 428/423.3; 428/425.6; 428/500; 428/621; 428/624; 428/626; 428/629; 428/632; 428/700
[58] Field of Search ............................... 428/423.3, 425.6, 428/412, 702, 500, 621, 624, 626, 629, 632

[56] References Cited

U.S. PATENT DOCUMENTS

| | | | |
|---|---|---|---|
| 4,094,763 | 6/1978 | Gillery et al. | 204/192.29 |
| 4,113,599 | 9/1978 | Gillery | 204/192.13 |
| 4,335,187 | 6/1982 | Rukavina et al. | 428/412 |
| 4,434,284 | 2/1984 | Rukavina et al. | 528/58 |
| 4,435,450 | 3/1984 | Coleman | 427/385.5 |
| 4,554,318 | 11/1985 | Rukavina | 525/118 |
| 4,609,703 | 9/1986 | Rukavina | 524/360 |
| 4,610,771 | 9/1986 | Gillery | 204/192.1 |
| 4,622,120 | 11/1986 | Gillery | 204/192.26 |
| 4,670,350 | 6/1987 | Rukavina | 428/520 |
| 4,725,501 | 2/1988 | Rukavina et al. | 428/412 |
| 4,731,289 | 3/1988 | Coleman | 428/334 |
| 4,857,407 | 8/1989 | Coleman et al. | 428/412 |
| 4,904,526 | 2/1990 | Koskenmaki | 428/328 |
| 5,178,966 | 1/1993 | Gillery | 428/623 |

OTHER PUBLICATIONS

Anonymous, "Research Disclosure", *Low Molecular (Meth) Acrylic Copolymers*, Jun. 1995, p. 366.
Union Carbide "Cycloaliphatic Epoxide Systems" information brochure bearing copyright dates 1970, 1976, 1978, 1987, 1989 (28 pages).

*Primary Examiner*—Leszek Kiliman
*Attorney, Agent, or Firm*—Donald C. Lepiane

[57] ABSTRACT

The present invention relates to an aircraft transparency including an electroconductive metal oxide coating over a rigid plastic substrate, and a polyurethane protective liner over the metal oxide coating, and more specifically to the use of a primer for adhering the metal oxide coating to the substrate and/or a primer for adhering the polyurethane protective liner to the metal oxide coating. The metal oxide primer includes a carbonate diol-based crosslinked polyurethane. The polyurethane primer is selected from the group consisting of a crosslinked copolymer of acrylic acid and substituted acrylates such as 2-ethylhexylacrylate; a crosslinked copolymer of cyanoethylacrylate and acrylic acid; and a crosslinked terpolymer of 2-ethylhexylacrylate, cyanoethylacrylate and acrylic acid.

51 Claims, 1 Drawing Sheet

AIRCRAFT TRANSPARENCY

CROSS REFERENCE TO RELATED APPLICATIONS

U.S. patent application Ser. No. 08/743,875, now pending, filed even date in the name of Thomas G. Rukavina and Robert M. Hunia for "Primer For Promoting Adhesion Of Electroconductive Metal Oxide Coating To Plastic Substrates" and U.S. patent application Ser. No. 08/743,874, now pending, filed even date in the name of Thomas G. Rukavina and Robert M. Hunia for "Primer For Promoting Adhesion Of Polyurethane To A Metal Oxide Coating On A Transparent Substrate" are related to the instant application, both of which are incorporated herein by reference.

BACKGROUND

1. Field of the Invention

The present invention relates to an aircraft transparency having a polyurethane protective liner over an electroconductive metal oxide coating over a rigid plastic substrate, and more specifically to the use of a primer for adhering the metal oxide coating to the substrate and/or a primer for adhering the polyurethane protective liner to the metal oxide coating.

2. Description of the Related Art

Today's aircraft window, usually referred to as an aircraft transparency, has developed far from its earliest stages of development of a single pane of common glass. The current art includes a selection of base materials comprising several types of glass and plastics. Glass base materials include chemically tempered glass and thermally tempered glass. Plastic base materials include cast acrylics, stretched acrylics, and polycarbonates, among others. Also included are laminates which include multiple layers of glass, plastic or both.

For example, aircraft transparencies may include interlayers for joining base materials together selected from materials including polyvinyl butyral, urethanes and silicones. Aircraft transparencies may also include protective liners, generally selected from polyurethanes, which overlay the surfaces of the base materials isolate the plastic from the environment to protect the plastic surfaces from abrasion and crazing, and extend the serviceability of the transparencies. Conductive coatings of metals or metal oxides, including tin oxide or indium tin oxide may be included between the interlayers of the transparency and, among other things, energized with electric current to melt ice and remove moisture from the outer surface of the transparency. Sealing systems, attachment systems and protection against electromagnetic interference and electromagnetic pulses all form a part of the advanced technology of today's aircraft transparency.

For those aircraft transparencies which include a plastic base material, efforts have been made to adhere various materials to the base material.

U.S. Pat. No. 4,335,187 to Rukavina et al. discloses a metal retainer, e.g. a stainless steel retainer, for mounting a transparency to the aircraft body, which retainer is bonded to polycarbonate, e.g. the polycarbonate inboard ply of the transparency, by a polyurethane adhesive. The polyurethane adhesive includes an isocyanate-terminated polyester urethane crosslinked with a trifunctional compound such as triisopropanolamine. The adhesive provides high strength flexible bonding between the metal retainer and the inboard ply.

U.S. Pat. No. 4,435,450 to Coleman discloses applying abrasion resistant thin polyurethane coatings to polycarbonate based aircraft transparencies with crosslinked aliphatic polycarbonate urethane coatings applied from solutions of a prepolymer and a crosslinking agent which are flow or dip coated onto the substrate.

U.S. Pat. Nos. 4,554,318; 4,609,703 and 4,670,350 to Rukavina disclose copolymers of acrylic acid and cyanoethylacrylate for bonding indium oxide films to acrylic substrates. Also disclosed is a terpolymer of cyanoethylacrylate, acrylic acid and hydroxyethylacrylate for the same purpose.

U.S. Pat. No. 4,725,501 to Rukavina discloses a silicate/titanate copolymer for use as a primer to adhere a vinyl interlayer to stretched acrylic or indium/tin oxide coated stretched acrylic substrate.

Other combinations of metal oxides and methods for applying them to a substrate are described in U.S. Pat. Nos. 4,094,763; 4,113,599; 4,434,284; 4,610,771; 4,622,120; 4,904,526 and 5,178,966.

While various approaches and compositions to satisfactorily adhere a number of materials to the base materials of aircraft transparencies are disclosed and are acceptable, there are limitations, particularly for those transparencies which include metal oxide coatings and/or polyurethane protective liners. More particularly, separation of the metal oxide coating from the substrate may be caused by poor adhesion and/or the stress of unequal expansion and contraction of the metal oxide coating with respect to either the substrate itself and/or to the polyurethane protective liner. Even minor separation can result in rejection of the aircraft transparency.

Further, it is important that where the aircraft transparency includes a polyurethane protective liner to, among other things, protect the metal oxide coating from impingement damage, abrasion or chemical attack that the liner remain strongly adhered to fully protect the metal oxide coating.

As can be appreciated from the foregoing, it would be advantageous to provide an aircraft transparency that is a laminate having improved adhesion between the layers by providing primer(s) for use in adhering an electroconductive metal oxide coating to a substrate and/or adhering a polyurethane protective liner to electroconductive metal oxide coating which reduces or eliminates any separation between the metal oxide coating and either the substrate and/or the polyurethane protective liner.

SUMMARY OF THE INVENTION

The present invention relates to an improved aircraft transparency; the aircraft transparency improved by the practice of the invention is of the type which includes a plastic substrate and an electroconductive metal oxide coating disposed over the plastic substrate. The improvement of the invention is the inclusion of a primer hereinafter the "metal oxide primer" for adhering the metal oxide coating over the substrate. The metal oxide primer includes a carbonate diol-based crosslinked polyurethane that preferably is a reaction product of a carbonate diol, a low molecular weight polyol and polymeric methylene diisocyanate (hereinafter "MDI"). The metal oxide primer of the instant invention imparts flexibility which reduces or inhibits the effects of stress on the electroconductive metal oxide coating, provides good adhesion of the metal oxide coating to the substrate without undesirable distortion of light, and has a low coefficient of expansion. In one embodiment of the invention, the index of refraction of the metal oxide primer matches that of substrate, to eliminate the undesirable optical effect of scratches, minor surface irregularities and the like on the substrate surface. When the aircraft laminate includes a polyurethane protective liner which liner is applied as an uncrosslinked polymer dissolved in a solvent whereupon the solvent is removed and crosslinking occurs to form the liner, the metal oxide primer of the instant invention also resists swelling due to contact with the polyurethane protective liner's solvent. This solvent can contact the metal oxide primer by passing through defects in the metal oxide coating. The metal oxide primer of the instant invention may also be used to adhere metals such as gold, metal nitrides such as titanium nitride, and/or the metal oxide coatings, to a plastic substrate, however the discussion herein is directed to its use with metal oxide coatings, particularly indium/tin oxide coatings, e.g. those having a ratio of indium oxide to tin oxide of about 9:1.

The present invention further includes a primer for adhering a polyurethane protective liner over a metal oxide coating (hereinafter the "polyurethane primer"). The polyurethane primer is selected from the group consisting of: a crosslinked copolymer of acrylic acid and substituted acrylates such as 2-ethylhexylacrylate; a crosslinked copolymer of cyanoethylacrylate and acrylic acid; and a crosslinked terpolymer of cyanoethylacrylate; 2-ethylhexylacrylate and acrylic acid. The polyurethane primer of the present invention exhibits, among other things, improved bonding of the polyurethane protective liner to the metal oxide coating and provides a shear absorbing layer which reduces shear stress on the electroconductive metal oxide coating caused by the differing coefficients of expansion between the metal oxide coating and the polyurethane protective liner.

As will be appreciated, the present invention contemplates the use of metal oxide primer and polyurethane protective liner primer together or separately. The invention also includes a method of making aircraft transparencies of the type discussed above.

DESCRIPTION OF THE PREFERRED EMBODIMENTS

The present invention is directed to an improved aircraft transparency and method for making an improved aircraft transparency of the type having a plastic substrate, an electroconductive metal oxide coating disposed over the substrate and/or a polyurethane protective liner disposed over the electroconductive metal oxide coating. The improvement is directed to the inclusion of a metal oxide primer of the instant invention for improving the adhesion of the metal oxide coating to the surface of the substrate, and/or the inclusion of the polyurethane primer of the instant invention for improving adhesion of the polyurethane protective liner to the metal oxide coating. As will be appreciated, the aircraft transparencies made in accordance with the present invention are not limited to the configuration comprising a substrate/metal oxide primer/ metal oxide coating/polyurethane primer/polyurethane protective liner, but may further include interlayers, other liners, primer, coatings and the like and/or may exclude one of the primers.

Figure 1:
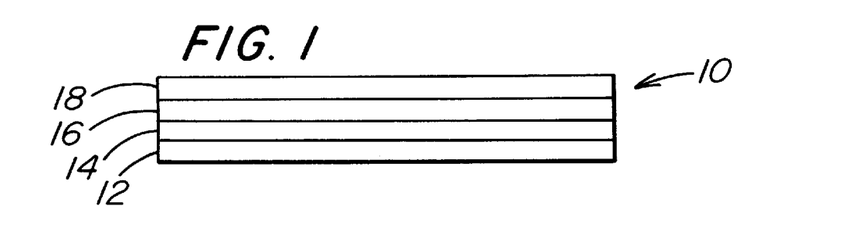
FIG. 1 is a side elevational view of an aircraft transparency illustrating the metal oxide primer of the present invention adhering a metal oxide coating to a substrate.

FIGS. 1–4 illustrate the placement of each of the layers of an aircraft transparency according to the instant invention and are not a representation of the relative thickness of each layer. With reference to FIG. 1, there is illustrated a cross section of an aircraft transparency 10 including the metal oxide primer 14 of the instant invention interposed between and adhering together a substrate 12 and a metal oxide coating 16. Although not limited to the invention, a polyurethane protective liner 18 is adhered to the metal oxide coating 16 in any convenient manner.

Figure 2:
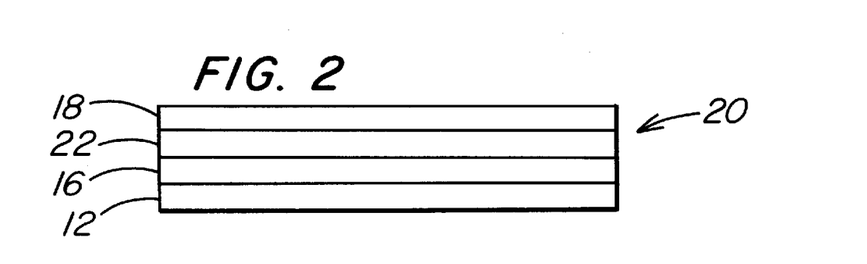
FIG. 2 is a view similar to the view of FIG. 1 illustrating polyurethane primer of the present invention adhering a polyurethane protective liner to a metal oxide coating.

Referring now to FIG. 2, there is shown a cross section of an aircraft transparency 20 of the present invention including a metal oxide coating 16 deposited on the substrate 12 and a polyurethane primer 22 incorporating features of the invention interposed between and adhering together the metal oxide coating 16 and the polyurethane protective liner 18.

Figure 3:
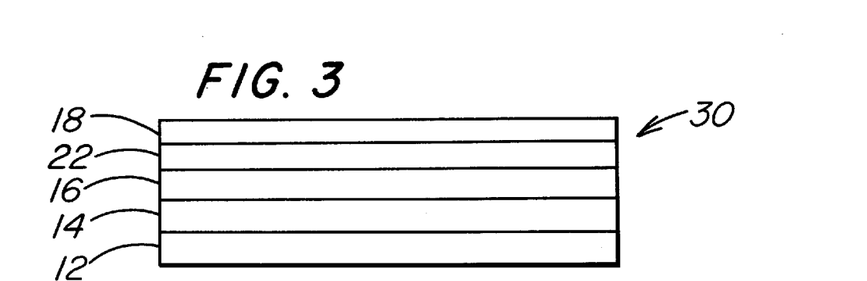
FIG. 3 is a view similar to FIG. 1 showing the metal oxide primer of the present invention adhering the metal oxide coating to the substrate and the polyurethane primer of the present invention adhering the polyurethane protective liner to the metal oxide coating.

Referring now to FIG. 3, there is shown a cross section of an aircraft transparency 30 of the present invention including the metal oxide primer 14 interposed between and adhering together the substrate 12 and the metal oxide coating 16, and the polyurethane primer 22 of the instant invention interposed between and adhering together the metal oxide coating 16 and the polyurethane protective liner 18.

Figure 4:
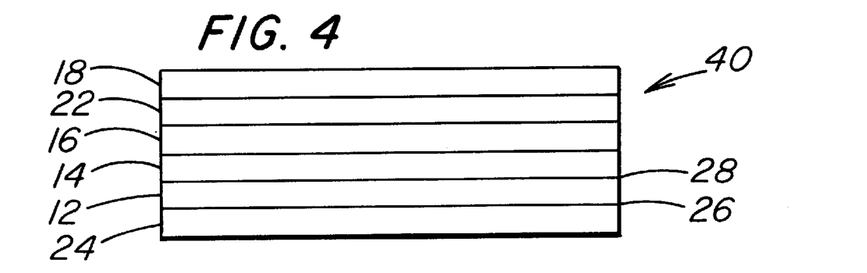
FIG. 4 is view similar to FIG. 3, showing an additional polyurethane protective liner bonded to the inboard surface of the aircraft transparency.

Referring now to FIG. 4, there is shown a cross section of an aircraft transparency 40 of the present invention including the metal oxide primer 14 interposed between and adhering together substrate 12 and the metal oxide coating 16, and the polyurethane primer 22 interposed between and adhering together the metal oxide coating 16 and the polyurethane protective liner 18. Polyurethane protective liner 24 is disposed over and adhered in any convenient manner to the substrate 12 on surface 26 of substrate 12 opposite the surface 28 of substrate 12 having the metal oxide primer 14 adhered thereto. The polyurethane protective liner 24 is disposed over the surface 26 of substrate 12 corresponding to the inboard surface of the aircraft transparency of the present invention, i.e. the surface of the transparency facing the interior of the aircraft.

The substrate 12, metal oxide primer 14, metal oxide coating 16, polyurethane protective liner primer 22 and polyurethane protective liners 18 and 24 are discussed in detail below.

I. The Substrate

The substrate of the present invention is preferably, but not limited to, a monolithic plastic or a laminate which has a plastic surface. The substrate may be rigid or flexible, transparent or opaque. In the instance when the end product is a transparency e.g. a window, the substrate is preferably transparent. Rigid substrates are generally preferred for aircraft transparencies. In the following discussion, the invention will be discussed with reference to a plastic substrate; however, as can be appreciated, the invention is not limited thereto and in the practice of the invention it is preferred to use a substrate that is either plastic or if not plastic has a plastic surface. The substrate is preferably either a polycarbonate, cast acrylics, a biaxially oriented crosslinked polymethylmethacrylate, also known as a stretched acrylic or a polyurethane among others. The preferred substrate is a polycarbonate.

Examples of polycarbonate substrates that may be used in the practice of the invention include, but are not limited to, polycarbonate polyurethanes and bisphenol A polycarbonate. Other substrates include substrates made from the monomer allyl diglycol carbonate, which is sold under the trademark "CR-39" by PPG Industries, Inc. of Pittsburgh, Pa.

As may be appreciated, the thickness of the substrate may vary over a broad range depending upon its application. Typically for an aircraft transparency which includes only a stretched acrylic substrate (as opposed to a laminate of more than one substrate material) the stretched acrylic substrate has a thickness of about 0.125 to 1 inch (about 3 to 25 millimeters). An aircraft transparency that includes only polycarbonate typically has a thickness of about 0.001 inch to 1 inch (0.025 to 25 mm). As can now be appreciated, the invention is not limited to the thickness of the substrate and the substrate may be of any thickness.

II. The Metal Oxide Primer

In accordance with the present invention, the metal oxide primer preferably has:

(1) a coefficient of expansion in the range between the coefficient of expansion of the substrate and the coefficient of expansion of the metal oxide coating to prevent buckling of the metal oxide coating in compressive stress;

(2) an elastic modulus that is higher than the elastic modulus of the substrate to prevent buckling and cracking of the primer with the expansion and contraction of the substrate;

(3) good adhesion to the substrate;

(4) good adhesion to the metal oxide coating;

(5) a refractive index that is within ±2% of the refractive index of the substrate. When the refractive index of the metal oxide primer is within that range as the metal oxide primer fills surface irregularities (e.g. surface scratches present on the surface of the substrate) during its application, the filled surface irregularities are rendered no longer visible rendering acceptable a substrate which might otherwise be optically objectionable due to the presence of such surface irregularities; and (6) sufficient adhesion to maintain the metal oxide coating on the substrate when the transparency is subjected to temperature ranges of −65° F. to 230° F. (−53.9° C. to 110° C.) and when the transparency is subjected to moist/wet conditions (e.g. a 30-day 105° F. (40.6° C.) 100% humidity Cleveland Condensing Cabinet Humidity Test, which is discussed in more detail below.

The metal oxide primer should permit the metal oxide coating to survive strains of up to 1.0% which include the total of applied bending strains plus thermally induced expansion or compression strains. The preferred method of measuring strain is discussed in detail below. The invention will be discussed using the metal oxide primer disclosed below. As will be appreciated, the invention is not limited thereto and other metal oxide primers to provide the transparency of the instant invention may be used.

The metal oxide primer preferably used in the practice of the invention is a thermoset high modulus polymer which is a good film former, and is transparent and colorless. Preferably, the metal oxide primer of the present invention is a carbonate diol-based crosslinked aromatic polyurethane. It is a reaction product of a carbonate diol, a low molecular weight polyol and an isocyanate composition. Low molecular weight polyol is defined herein as a polyol having a molecular weight of less than about 300 g/mole. These reactants are combined in a solvent. The reaction mixture may also include in addition to the foregoing, a catalyst and/or a surfactant. The reaction mixture is referred to hereinafter as "the metal oxide primer composition". Each of the components of the metal oxide primer composition is discussed in detail below.

II.A. The Carbonate Diol

The carbonate diol preferred in the practice of the invention is a high molecular weight polyol, having a molecular weight of about 1000 g/mole and functions to extend the length of crosslinks formed in the metal oxide primer which in turn imports more flexibility to the metal oxide primer to allow the absorption of more shear stress to prevent the metal oxide coating from buckling or cracking. The carbonate diol may include either a hexanediol-cyclohexanedimethanol-based carbonate diol or may simply include a hexanediol-based carbonate diol. The carbonate diol of the present invention may have the general formula:

$$HO(ROCOO)_aROH \qquad \text{(Formula 1)}$$

where a is an integer from 2 to 9, preferably 4, and where each R group in Formula 1 is independently $-(CH_2)_b-$, where b is an integer from 2 to 8, preferably 6, or

.

A suitable hexanediol-cyclohexandimethanol-based carbonate diol includes KM-10-1667 available from Stahl, Inc. of Boston, Mass., having the following formula:

(Formula 2)

where c and d are independently integers from 1–6, and c and d are preferably each 3.

Where a more flexible primer is desired, some or all of the carbonate diol may be a hexanediol-based carbonate diol instead of one which includes the cyclohexane-based groups. A suitable hexanediol-based carbonate diol is one having the formula:

$$HO(CH_2CH_2CH_2CH_2CH_2CH_2OCOO)_e$$
$$CH_2CH_2CH_2CH_2CH_2CH_2OH \qquad \text{(Formula 3)}$$

where e is an integer from 2 to 13, preferably 6.

Although the invention contemplates but is not preferred in the practice of the invention, the cyclohexane-based diol component may be replaced completely with an aliphatic straight chained based carbonate diol. This is not preferred because where the carbonate diol is comprised only of aliphatic straight chained diols the metal oxide primer may become too flexible and the coefficient of expansion of the primer may substantially outstrip that of the metal oxide coating causing the metal oxide coating bonded to the metal oxide primer to crack as the metal oxide primer expands or contracts. Preferably not more than half the carbonate diol will be comprised of hexanediol-based carbonate diols.

II.B. The Low Molecular Weight Polyol

The low molecular weight polyol is a compound of the general formula:

$$C_fH_{(2f+2-g)}(OH)_g \qquad \text{(Formula 4)}$$

having a molecular weight of less than about 300 grams per mole, where f is an integer from 4–18, and g is an integer independently selected from 3–12. Preferably f is an integer from 5–7 and g is an integer from 3–6. The low molecular weight polyol may include an aliphatic triol having a molecular weight of 100–300, however any low molecular weight aliphatic polyol having more than two hydroxyl groups may be used. A preferred low molecular weight polyol is trimethylolpropane. Pentaerythritol is a satisfactory substitute for trimethylolpropane.

II.C. The Isocyanate Composition

Polymeric MDI exists in several isomers. Further, polymeric MDI may include products which contain more than two aromatic rings in the molecule, such as 3- and higher ring compounds. Thus polymeric MDI may be a mixture of many chemical individuals, and consequently polymeric MDI is offered commercially as a wide variety of products having a wide variety of molecular weights ranging from polymers including the pure 4,4'-two ringed product to products including all of the MDI isomers.

The polymeric MDI preferably used in the present invention may be represented more or less generically by the following Formula 5:

(Formula 5)

wherein the NCO groups and methylene groups, (—CH$_2$—), may be in any position on the phenyl ring, although as may be appreciated, an NCO group and a methylene group will not be in the same position on the same phenyl ring.

The polymeric MDI of the present invention may alternatively be described as an alternating polymer of the series:

(Formula 6)

where Ph is phenyl and Me is methylene, and each of the phenyl groups includes an NCO group bonded thereto. As with the generic formula set forth above, each of the NCO groups and methylene groups may be envisioned as being in any position on the phenyl groups, although as may be appreciated, an NCO group and a methylene group will not be in the same position on the phenyl ring.

One polymeric MDI which may be used in the preparation of the novel metal oxide primer of the present invention is a product of Bayer Corporation of Pittsburgh, Pa., available under the trade name "MONDUR MR".

Typical molecular weights of polymeric MDI products are generally at least about 460 grams per mole. Polymeric MDI products having molecular weights of about 1000 grams per mole are preferred.

II.D. The Solvent

In the practice of the invention, the solvent is organic and does not cause visible degradation of the substrate surface. Particularly when the substrate is a bisphenol-A polycarbonate, a solvent can visibly degrade the surface of the substrate by partial dissolution of the substrate surface. The solvents of the instant invention are selected in part, with solubility parameters which are different from those of the substrate, whereby the solvents of the instant invention do not cause visible degradation of the substrate surface. The solvent of the metal oxide primer of the present invention is preferably selected from tertiary alcohols, ketones and ethers. Tertiary alcohols include diacetone alcohol, t-butanol, and t-pentanol. Ketones include cyclohexanone and cyclopentanone. Ethers include butylether. Mixtures of these solvents are also contemplated by the instant invention. The preferred solvent is diacetone alcohol.

II.E. The Catalyst

Although not required but preferred in the practice of the invention is the use of a catalyst to promote the reaction of the isocyanate of the polymeric MDI with the hydroxyl groups of the carbonate diol and the hydroxyl groups of the low molecular weight polyol to yield a urethane. Stannous octoate and butyl stannic acid are acceptable catalysts. The preferred catalyst is dibutyltindilaurate.

II.F. The Surfactant

Although not required but preferred in the practice of the invention, a surfactant may be used which functions as a flow control agent. When the metal oxide primer is applied to a substrate, visible distortion may result in the transparency from individual pockets of primer which are formed by gradients in the surface tension of the primer. The surfactant lowers the surface tension of the primer, allowing the primer to flow together to form a uniform film on the substrate surface. A suitable surfactant includes a fluorinated nonionic surfactant manufactured by 3M Corporation of St. Paul, Minn., available under the trade name "FC430". Other suitable surfactants include surfactants sold under the trade name "BYK300" or "BYK306" manufactured by Byk-Chemie of Germany.

II.G. The Ratios of the Components

The ratios of the various components of the metal oxide primer of the present invention are as follows.

The ranges in wt % of the carbonate diol, polyol and polymeric MDI are set forth below in Table 1. These weight percent ranges assume that the carbonate diol has an equivalent weight of about 380 to 500 grams per equivalent. Equivalent weight is defined as grams of polymer per equivalent of hydroxyl groups present in the primer.

It is possible to use carbonate diols in the instant invention which have equivalent weights above or below the range of 380 to 500 grams per equivalent as defined and set forth above. However, as will be appreciated by those skilled in the art, other carbonate diol equivalent weights require a minor adjustment in the weight percent ranges shown in Table 1, (namely an adjustment in the ratios of weight percents of the polyol and carbonate diol) in order to obtain the metal oxide primer of the instant invention having the same thermomechanical properties such as glass transition temperature, elastic modulus and coefficient of expansion as is obtained from the carbonate diols having equivalent weights of 380 to 500 grams per mole. For example, where the equivalent weight of carbonate diol is above 500 g per equivalent, more polyol and less carbonate diol is required. When the equivalent weight of carbonate diol is below 380, more carbonate diol and less polyol will be required.

The weight percents shown in Table 1 are the solids contents by weight percent for the three solid components, (namely the carbonate diol, the polyol and polymeric MDI) in the metal oxide primer composition. The solids content is defined as that portion of the metal oxide primer composition other than the solvent or trace components (e.g. catalyst and/or surfactant).

TABLE 1

| SELECTED METAL OXIDE PRIMER COMPOSITION COMPONENTS | WEIGHT % BASED ON PRIMER COMPOSITION SOLIDS CONTENT |
|---|---|
| Carbonate Diol | 18.65–18.76 wt % |
| Polyol | 18.68–19.10 wt % |
| Polymeric MDI | 62.24–62.57 wt % |

With regard to the polymeric MDI, carbonate diol and low molecular weight polyol, for each equivalent of polymeric MDI, it is desirable to have about the same number of hydroxyl groups (combined from the hydroxyl groups present in the carbonate diol and low molecular weight polyol) as NCO groups in the polymeric MDI, that is a ratio of about 1±0.1 NCO groups to total hydroxyl groups in the metal oxide primer composition. Therefore, in accordance with the present invention, there is preferably for each equivalent of NCO groups in the polymeric MDI, about 0.9 to 1.1 equivalents of a combined total of hydroxyl groups in the metal oxide primer composition comprised of the hydroxyl groups present in the low molecular weight polyol and hydroxyl groups present in the carbonate diol.

The individual equivalent of the low molecular weight polyol's hydroxyl groups is preferably about 0.9 equivalents, preferably 0.9±0.1 equivalents, and the individual equivalent of the carbonate diol's hydroxyl groups is preferably at least 0.05 equivalents, preferably about 0.05 to 0.15 equivalents, more preferably about 0.1 equivalents.

Excess carbonate diol will result in a metal oxide primer which has an undesirably high coefficient of expansion and an undesirably low glass transition temperature such that when the primer expands or contracts, it does so at a rate that is much faster than the metal oxide coating causing the metal oxide coating to buckle or crack.

Insufficient carbonate diol will result in a metal oxide primer that has an insufficient coefficient of expansion resulting in high stress development in the primer as the substrate expands or contracts at a rate exceeding that of the primer which is transmitted to the metal oxide coating causing the metal oxide coating to crack.

Excess polyol has the same effect as insufficient carbonate diol on the primer. Insufficient polyol has the same effect as excess carbonate diol on the primer.

In a preferred embodiment, the novel primer of the present invention is a urethane defined as having a molecular weight per crosslink (designated "$M_c$") of about 276 grams per mole to 411 grams per mole, preferably about 340.3 grams per mole and a weight percent of urethane of about 24 wt % to 32 wt %, preferably about 27.5 wt % based on one equivalent of urethane group having an equivalent weight of 59 grams per equivalent.

The amount of catalyst present is in the range of about 0–600 ppm, preferably about 100 ppm of solids content in the metal oxide primer composition. As may be appreciated by those skilled in the art, the amount of surfactant necessary to sufficiently reduce surface tension will vary with the specific surfactant chosen. When the surfactant is FC430, it is preferred that at least 0.05 weight percent by weight of the metal oxide primer composition be used.

II.H. The Mixing of the Components II.A–F

The carbonate diol, low molecular weight polyol and polymeric MDI are blended and mixed in the solvent in the range of about 1 to 20 wt % solids content. A catalyst and/or a surfactant may be added. The reactants are blended to form the metal oxide primer composition. The components of the metal oxide primer composition are permitted to react until upon application to the substrate a clear polymeric film will form which has acceptable optical properties. Typically this reaction time is 2 hours at room temperature but can be accelerated with increased catalyst, increased solids contents or heat.

After the metal oxide primer composition is prepared the metal oxide primer composition is applied to the substrate surface as a solution by dip, spin, spray, flow or other conventional application technique, after cleaning the substrate surface with hexane and methanol as follows. First hexane is wiped over the substrate with a soft lint free cloth and the surface is then allowed to dry. Second, the surface is similarly wiped with methanol, and is again allowed to dry. Static may be removed from the surface of the substrate before application of the metal oxide primer composition as for example by the use of an antistatic gun.

After the metal oxide primer composition is applied to the cleaned substrate, it is allowed to air dry at room temperature until tack free. The solvent is then evaporated and the primer composition is cured at slightly elevated temperature, that is, above ambient temperature whereupon crosslinking will occur to form the crosslinked metal oxide primer of the instant invention. A temperature in the range of about 230° F.–265° F. (110° C.–129.4° C.) for approximately 1 to 2 hours, preferably two hours will suffice for curing.

II.J. Properties of the Metal Oxide Primer

The thickness of the metal oxide primer after cure is preferably in the range of about 0.5 to 10 microns, more preferably about 1.5 to 3 microns for optimum stress reduction and adhesion of the electroconductive metal oxide coating. The metal oxide primer has a glass transition temperature (Tg) of at least 230° F. (110° C.), preferably about 248° F. (120° C.). It has a molecular weight per crosslink of 276 to 411 g/mole, and a weight percent content of urethane of about 24 to 32 wt %. It also has a refractive index of about 1.5555 to 1.6155, preferably about 1.5855.

The metal oxide primer of the instant invention mitigates the effects of stress on the electroconductive coating caused by different coefficients of expansion between the metal oxide coating and the substrate. More particularly, the metal oxide primer acts as a shear-absorbing layer to reduce shear stress on the metal oxide coating.

The metal oxide primer permits the metal oxide coating to withstand strains of up to 1%. Strain may be measured by any known techniques, but preferably is measured as follows. A 1"×6" bisphenol A polycarbonate substrate, coated with the metal oxide primer of the instant invention and a metal oxide coating, has laminated to the metal oxide coating a pair of bus bars at opposite ends of the substrate.

The substrate is placed with the metal oxide coated bus bar "front" surface facing downwardly, over a pair of end supports located at opposite ends of the substrate, said supports being positioned more or less under the bus bars. A bending force is applied to the "backside" of the substrate by applying a downward force perpendicular to the substrate near the midpoint of the backside of the substrate between the two end supports, to bend the substrate between the supports, thereby inducing a radius of curvature in the substrate and providing a bending strain.

The temperature of the coated substrate may be raised or lowered during the bending process to induce a thermal expansion or compression strain to determine the ability of the metal oxide coating to withstand strain as a function of temperature.

Force is applied until an increase in the resistance between the bus bars of about 10% is obtained over the initial resistance prior to bending. This 10% increase in resistance has been found by the inventors to be indicative of the formation of microcracks in the metal oxide coating.

From a measured or calibrated radius of curvature corresponding to the amount of force applied, the temperature and the coated substrate composition and thickness, the % strain may be calculated. Coatings are deemed to have sufficient ability to withstand strain where they withstand strains of up to about 1% total strain with less than a 10% increase in resistance. Total strain includes bending strain plus thermal compression or expansion strains.

The metal oxide primer of the present invention also provides good water resistance and good adhesion of the electroconductive layer to the substrate as determined by subjecting samples to a 140° F. (60° C.) 100% humidity Cleveland Condensing Cabinet Humidity Test for up to six months, whereupon it was found by periodic scribe tape testing of samples taken during the Cleveland Condensing Cabinet Humidity Test, that no loss of adhesion was observed.

The Cleveland Condensing Cabinet Humidity Test includes supporting samples on a rack-type system within a Cleveland Condensing Cabinet manufactured by Q-Panel Corporation of Cleveland, Ohio, wherein the humidity, temperature and time of exposure to the aforesaid humidity and temperature can be controlled. Scribe tape testing includes cutting a coating on a substrate into squares by scribing with a razor knife followed by pressing a suitable adhesive tape against the coating and pulling the adhesive tape at approximately a 90° angle to the surface of the coating in an effort to delaminate the coating from the substrate. The scribe tape test is described in ASTM D3359-93 hereby incorporated by reference herein.

Further, in the preferred embodiment of the present invention, the index of refraction of the metal oxide primer matches that of a substrate, which permits the metal oxide primer to fill surface irregularities in the substrate, causing such surface irregularities to become invisible to the optically unaided eye permitting the use of substrates which are other than optically perfect.

Further, the metal oxide primer of the present invention has an important advantage stemming from its ability to resist solvents. More particularly, where a polyurethane protective liner is applied over a metal oxide coating, the solvent of the polyurethane protective liner can penetrate through defects in the metal oxide coating and undesirably swell certain metal oxide primers, resulting in cracking of the metal oxide coating. The metal oxide primer of the instant invention is able to withstand such polyurethane protective liner solvent contact without deformation or dimensional change and/or solvent-induced loss of adhesion of the metal oxide coating or primer. The metal oxide primer of the present invention is excellent at resisting such polyurethane protective liner solvent-induced degradation.

Further, the metal oxide primer of the present invention may be used in a wider role as a barrier film (with or without a metal oxide coating disposed thereon) to protect the substrate to which it is adhered from chemical attack from any number of overlying materials or environmental sources. For example, a polyvinyl butyral interlayer could be disposed over the metal oxide primer, wherein the metal oxide primer acts as a barrier film to block migration of plasticizer of the polyvinyl butyral to the substrate, which plasticizer would otherwise damage a polycarbonate substrate over which the metal oxide primer is disposed.

III. The Electroconductive Metal Oxide Coating

In addition to melting ice and removing moisture as discussed above, the metal oxide coatings of the instant invention can be used to absorb microwave energy for the protection of the aircraft occupants and/or as an antistatic coating to remove static electricity that may build up on the aircraft during flight. Such static electricity can, upon discharge, damage the aircraft transparency. Further, the build up of static charge can operate to attract oppositely charged particles of dirt and debris, causing such particles to collect on the transparency hindering the pilot's and/or other occupant's vision through the transparencies.

The electroconductive metal oxide coating may be placed on the metal oxide primer by any conventional known technique. Preferred techniques include magnetron sputtering vacuum deposition (hereinafter "MSVD") and/or the cathode sputtering methods of Gillery disclosed in U.S. Pat. No. 4,094,763, which is incorporated herein by reference in its entirety. See also U.S. Pat. Nos. 4,113,599; 4,610,771; 4,622,120 and 5,178,966 for additional procedures which may be used to apply metal oxide, particularly indium/tin oxide coatings or similar electroconductive coatings over the metal oxide primer on a rigid plastic substrate. The metal oxide primer of the present invention is particularly well suited to adhere coatings of indium oxide, tin oxide, or mixtures thereof and is particularly useful for metal oxide coatings comprising a ratio of indium to tin oxide of about 9:1 commonly applied by MSVD.

In the practice of the invention the metal oxide coating is indium/tin oxide, preferably has at least 3 ohms/sq. resistance and preferably is less than about 13,000 Å thick. A preferred metal oxide coating has a resistance of about 3 to 40,000 ohms/sq. and a thickness about 1400 to 13,000 Å. A particularly preferred metal oxide coating has a resistance of about 10 ohms/sq. and a thickness of about 7500 Å to maintain the metal oxide coating on the substrate through temperature ranges of about −65° F. to +230° F. (−53.9° C. to 110° C.)

IV. The Polyurethane Protective Liner Primer

In a preferred aircraft transparency of the present invention, the electroconductive metal oxide coating is protected with a polyurethane protective liner. The protective liner is adhered to the metal oxide coating by interposing a novel primer of the instant invention between the metal oxide coating and the polyurethane protective liner, the primer being referred to hereinafter as "the polyurethane primer". The polyurethane primer improves the adhesion of the polyurethane protective liner to the metal oxide coating. The invention will be discussed using the polyurethane primer disclosed below. As will be appreciated, the invention is not limited thereto and other polyurethane primers to provide the transparency of the invention may be used.

In one embodiment, the polyurethane primer of the instant invention is a crosslinked copolymer of acrylic acid (hereinafter "AA") and substituted acrylates such as 2-ethylhexylacrylate (hereinafter "EHA"). In an alternative embodiment of the present invention the primer is a crosslinked copolymer of cyanoethylacrylate (hereinafter "CEA") and AA. In still another embodiment of the present invention, the primer is a terpolymer of CEA/EHA/AA.

These copolymers and terpolymer are prepared by polymerizing the respective monomers in an appropriate solvent using a free radical initiator. It is a three step process in which the copolymer or terpolymer is formed in a first step, followed by formation of an uncrosslinked polyurethane primer composition in a second step, followed by a third step of applying the primer composition over the metal oxide coating and curing of the primer composition to cause the primer composition to crosslink, thereby forming the polyurethane primer of the instant invention on the metal oxide coating. The polyurethane primer is then overcoated with the polyurethane protective liner. The polyurethane primer has good adhesion to the metal oxide coating and to the polyurethane protective liner.

IV.A. Monomers and Ratios

Where the polyurethane primer is an EHA/AA copolymer, the mole ratio of EHA to AA in the polyurethane primer of the present invention may vary from 3:1 to 1:3. Where the polyurethane primer is a CEA/AA copolymer, the mole ratio may vary from 3:1 to 1:3. Where the polyurethane primer is a CEA/EHA/AA terpolymer, the mole ratio may vary from 1:2:1 to 0.5:0.5:3.

Increasing the mole ratio of AA beyond the specified mole ratio increases the solvent resistance of the polyurethane primer, but at the expense of raising the glass transition temperature of the primer. Increasing the mole ratio of CEA beyond the specified mole ratio increases the water absorption and reduces the humidity resistance. Increasing the mole ratio of EHA beyond the specified ratio lowers the glass transition temperature but simultaneously lowers the polyurethane primer's ability to withstand exposure to solvents that may be present in the polyurethane protective liner as the polyurethane protective liner is applied in liquid form over the polyurethane primer.

It is preferred that the polyurethane primer exhibit as low a glass transition temperature and as high a solvent resistance as possible. This is so because it is preferred to cure the polyurethane primer composition at a temperature above the glass transition temperature of the polyurethane primer itself, (to reduce thermally induced stresses and to obtain a complete cure of the polyurethane primer composition) and yet remain below a temperature that would cause thermal stress in the metal oxide coating. Where the polyurethane primer has a glass transition temperature after crosslinking of less than 180° F. (82.2° C.), the polyurethane primer composition can be fully cured but without developing thermally induced stresses in the metal oxide coating, (particularly an indium/tin metal oxide coating), which could occur with a glass transition temperature above 180° F. (82.2° C.).

For a metal oxide coating comprising indium/tin oxide having a 10 ohm/square resistance, over which a polyurethane primer having the preferred EHA/AA copolymer is deposited, the optimum ratio of EHA to AA in the copolymer is 2:1. This ratio will provide a desirably low starting glass transition temperature in the EHA/AA copolymer prior to crosslinking of about −30° F. (−34° C.) which results in a desirable glass transition temperature after crosslinking of about 131° F. (55° C.), well below the 180° F. (82.2° C.) threshold discussed above. The EHA/AA copolymer has a desirable crosslinking density which resists solvent degradation by solvents of the polyurethane protective liner. (The starting glass transition temperature of the polyurethane primer composition prior to crosslinking directly affects the final glass transition temperature of the polyurethane primer after crosslinking.) This ratio of 2:1 of EHA to AA is also preferred because it provides a sufficient number of hydroxyl groups in the polyurethane primer after reaction of the AA with a crosslinker as discussed below, which hydroxyl groups are necessary for adhesion of the polyurethane primer to the metal oxide coating.

The molecular weight range of the EHA/AA copolymer, CEA/AA copolymer or CEA/EHA/AA terpolymer of the present invention prior to crosslinking is about 10,000 to 100,000, preferably 25,000 to 50,000 grams per mole.

IV.B. Solvent

More particularly, the copolymers or terpolymer of the instant invention are formed in a first step by adding the respective monomers to an appropriate solvent, such as 1-methoxy-2-propanol where the monomers comprise 10 to 80 wt %, -preferably 40 to 60 wt % of the monomer/solvent solution. The monomer/solvent solution is stirred until thoroughly blended. The solution is sparged with dry nitrogen for about 20 minutes to displace any oxygen in the solution which oxygen would terminate free radical polymerization.

IV.C. Free Radical Initiator

Next, a free radical initiator is added and mixed at about room temperature until dissolved. Appropriate free radical initiators include azobisisobutyronitrile (hereinafter "AIBN"). Weight percents of initiator can be varied from 0.01 wt % to 2.0 wt % but are preferably about 0.10 to 1.0 wt % by weight of the monomers present in the monomer/solvent solution.

IV.D. Formation of Copolymer or Terpolymer

Upon addition of the free radical initiator, polymerization of the monomers commences when the temperature of the solution is raised to about 147.2° F. (64° C.). Stirring is continued during the polymerization process. Total reaction time is generally about 12 hours to obtain high conversion of monomers to the respective copolymers or terpolymer. Percent conversion preferably ranges from about 94 to 99%. A nitrogen blanket is kept over the solution throughout the polymerization to prevent oxygen inhibition of the free radical polymerization.

At the end of the polymerization process, the resulting product is a clear viscous liquid with a slight amber cast.

IV.E. Formation of Polyurethane Primer Composition

In a second step, at least a portion of the copolymer or terpolymer formed in the first step is blended with additional components to form a polyurethane primer composition. More particularly, the copolymer or terpolymer described above is blended with a crosslinker, an optional catalyst, an optional surfactant, and an optional additional higher boiling solvent to form a polyurethane primer composition. The polyurethane primer composition has a solids content of about 10% to 50%, preferably 20% to 40% solids by weight of polyurethane primer composition. The individual components of the primer composition are discussed as follows.

IV.E.1. Crosslinking Agent

The crosslinking agent of the polyurethane primer composition includes cycloaliphatic compounds, including cycloaliphatic diepoxides, and still further including compounds of the general formula:

(Formula 7)

where h is an integer from 0 or 1 and i is an integer from 2 to 6.

Two particular cycloaliphatic diepoxides useful with the present invention are available under the trade names are ERL-4221 and ERL-4299 from Union Carbon of Danbury, Conn.

ERL-4221 is 3,4-epoxycyclohexylmethyl-3,4-epoxycyclohexanecarboxylate whose chemical formula is shown below:

(Formula 8)

ERL-4229 is bis(3,4-epoxycyclohexyl)adipate, whose chemical formula is shown below:

(Formula 9)

The appropriate amount of crosslinker to be added to the polyurethane primer composition is conveniently calculated in terms of the epoxy group equivalents in the crosslinker versus carboxylic acid group equivalents in the copolymer or terpolymer. The epoxy group equivalents provided by the crosslinker should be in excess of the carboxylic acid group equivalents provided by the EHA/AA or CEA/AA copolymers, or the CEA/EHA/AA terpolymer respectively. The ratio of carboxylic acid group equivalents in the copolymer or terpolymer to the epoxy group equivalents in the crosslinking agent is known as the "R value", and is defined in Equation 1 as follows:

$$R_{value} = \frac{\text{equivalents of carboxylic acid groups in the copolymer or terpolymer}}{\text{equivalents of epoxy groups in the crosslinking agent}}$$

(Equation 1)

The R value must be adjusted to account for homopolymerization of the epoxy groups while still reacting all of the carboxylic acid groups. R values in accordance with the present invention can vary from about 0.5 to 0.9 but are dependent on the acid strength of the respective copolymer or terpolymer, and the amount of catalyst added, as both can promote homopolymerization of the epoxy component of the crosslinking agent requiring more crosslinking agent in order to have sufficient crosslinking agent in the polyurethane primer composition to react all of the carboxylic acid groups. It is particularly preferred to maintain R values of about 0.6 to 0.8, to assure that all the carboxylic acid groups are reacted.

Failure to react all of the carboxylic acid groups provided by the respective copolymer or terpolymer will result in longer time requirements for curing the polyurethane protective liner after it is applied over the polyurethane primer, particularly at the polyurethane protective liner/primer interface, where unreacted carboxylic acid groups in the polyurethane primer will reduce the reactivity of the polyurethane protective liner's reactive components. This can result in the polyurethane protective liner curing slowly on the surface adjacent the polyurethane primer, but curing rapidly on the surface opposite the surface adjacent the polyurethane primer (hereinafter the "outer surface"). If the outer surface of the polyurethane protective liner cures faster than the rest of the polyurethane protective liner, surface wrinkling and streaking of the polyurethane protective liner may result. Where polyurethane protective liner coating compositions having relatively low viscosity, i.e. 500 centipoise, are used, this effect tends to be more pronounced; high viscosity combined with lower cure temperatures will tend to ameliorate the undesirable effects. Failure to react all of the carboxylic acid groups in the polyurethane primer will also result in reduced crosslink density (because all of the carboxylic acid groups are not crosslinked) and reduced solvent resistance in the polyurethane primer because of the reduced crosslink density.

IV.E.2. Optional Higher Boiling Point Solvent

A higher boiling point solvent may be added to the polyurethane primer composition to dilute the composition in order to lower the solids content of the primer composition and slow the rate of solvent evaporation, allowing the solvent to remain in the polyurethane primer composition for sufficient time before its eventual evaporation and slightly delay the crosslinking reaction described below, so as to permit the polyurethane primer composition to flow evenly upon its application over the metal oxide coating, thereby forming a uniform film having optimal optical qualities after crosslinking. A preferred higher boiling point solvent is diacetone alcohol. The higher boiling point solvent is added from about 0 to 40 wt % of the polyurethane primer composition. Exceeding about 40 wt % causes solvent to be trapped in the polyurethane primer.

IV.E.3. Surfactant

A surfactant, which functions as a flow control agent, may be added to the polyurethane primer composition to improve the flow of the polyurethane primer composition. When the polyurethane primer composition is applied over the metal oxide coating, visible distortion may result from individual pockets of primer which are formed by gradients in the surface tension of the primer. The surfactant lowers the surface tension of the primer, allowing the primer to flow together to form a uniform film on the metal oxide coating. A preferred surfactant is available under the trade name "BYK303" which is a available from BYK Chemie of Germany. The amount of surfactant is preferably at least about 0.05 wt % by weight of the crosslinking solution.

IV.E.4. Optional Catalyst

An optional catalyst is included with the polyurethane primer composition to promote the crosslinking reaction, which can be a Lewis acid catalyst, such as dibutytindilaurate, stannous octoate, or uranyl nitrate. The catalyst may also be of the nucleophilic type such as triphenylphosphine or triethylamine. Weight percents range from 0.1% to 5.0% but preferably 0.5% to 2.0% by weight of polymer and crosslinker present in the primer composition.

IV.E.5. Blending of Components in a Solvent to Form Polyurethane Primer Composition The EHA/AA copolymer, crosslinking agent, catalyst (if present), surfactant (if present), and higher boiling point solvent (if present) are combined in a solvent to form the polyurethane primer composition. Suitable solvents include alcohols and ketones. A preferred solvent is 1-methoxy-2- propanol, available under the trade name "Dowanol PM" from Dow Chemical of Midland, Mich. The amount of solvent in accordance with the present invention is about 40 to 90 wt % of the polyurethane primer composition, preferably 60 to 70 wt %. About 90 wt % solvent causes poor adhesion of the polyurethane protective liner to the polyurethane primer. Falling below about 40 wt % solvent results in unacceptable optics due to poor flow properties resulting in poor optical properties in the polyurethane primer due to the increased viscosity of the primer composition.

IV.E.6. Application of the Polyurethane Primer Composition Over a Metal Oxide Coating and Crosslinking to Form the Polyurethane Primer of the Instant Invention The polyurethane primer composition is preferably applied over the metal oxide coating by conventional processes including dipping, spraying or flow coating to a thickness of about 0.25 mils to 3 mils. The polyurethane primer composition is air dried at room temperature until the viscosity of the polyurethane primer composition stabilizes. Air drying generally requires ½ to 1 hour. The polyurethane primer composition is then cured, generally at a temperature between about 180° F. to 230° F. (82.2° C. to 110° C.), preferably about 180° F. (82.2° C.) resulting in crosslinking of the polyurethane primer composition to form the polyurethane primer of the instant invention. Curing will be generally satisfactory after 8 hours, but about 12 hours is recommended to assure complete curing. Persons skilled in the art will alter the cure time inversely with temperature according to the particular circumstances and formulation used.

The polyurethane protective liner is then formulated and applied over the polyurethane primer as follows.

V. The Polyurethane Protective Liner

The polyurethane protective liner deposited on the polyurethane primer of the present invention is preferably a transparent layer which is a reaction product of an isocyanate and a polyol such as a diisocyanate reacted with a trifunctional polyol or a triisocyanate reacted with a difunctional polyol.

Preferred isocyanates include aliphatic diisocyanates, aromatic diisocyanates and aromatic triisocyanates.

The polyols can be polycarbonates, polyesters or polyethers or any combination of these polyols combined into a urethane polyol. The polyols typically have number average molecular weights from about 250 to about 6000, preferably from 1000 to 2000. Preferred polyols include polycaprolactone polyol, hexanediol carbonate polyol, cyclohexanedimethanol carbonate polyol, phthalate ester polyol, hexanediol/cyclohexanedimethanol carbonate polyol and mixtures thereof.

The preferred polyurethane protective liner is a crosslinked thermoset polycarbonate polyurethane.

The polyurethane protective liner is applied as an about 80% solids solution over the polyurethane primer that has been applied over the metal oxide coating as described above. The thickness of the cured polyurethane protective liner ranges from 1 mil to 5 mils. The thickness is critical to the protection of the metal oxide coating because the polyurethane protective liner is designed to protect the metal oxide coating and the substrate from abrasion damage, impingement damage and ultraviolet light damage. The thicker the polyurethane protective liner the better the protection of the underlying layers.

Physical properties of the polyurethane protective liner of the instant invention include a molecular weight per crosslink of about 500 to 10,000 grams per mole, where 1000 to 6000 grams per mole is preferred, and more preferred still is a molecular weight per crosslink of about 1909 grams per mole. The polyurethane protective liner has a molecular weight between branch points of about 1279 grams per mole. The urethane content of the polyurethane protective liner can range between 5 to 30%, with a preferred range of about 8 to 22% and a still more preferred urethane content of about 9.4%. The crosslink density and urethane content determine in part the mechanical properties and weatherability of the polyurethane protective liner of the present invention.

To the polyurethane protective liner composition may be added additional compounds, including but not limited to ultraviolet light absorbers, antioxidants, and/or hindered amine light stabilizers.

Polyurethane compositions and reactants are described in detail in the above cited references, particularly U.S. Pat. Nos. 4,335,187 and 4,435,450; see also U.S. Pat. No. 4,434,284. The disclosures of these patents are incorporated herein by reference.

The following are examples of the present invention; however, as can be appreciated, the invention is not limited thereto.

EXAMPLE 1

In this example, a polycarbonate substrate was primed with a metal oxide primer and coated with an indium/tin oxide coating as follows. The metal oxide primer included carbonate diol, a low molecular weight polyol and polymeric MDI blended as shown in Table 2 below:

TABLE 2

| Component | Hydroxyl Equivalents | Isocyanate Equivalents | Wt % by Weight Solids Content |
|---|---|---|---|
| Carbonate Diol (KM-10-1667 - molecular weight of about 1000 grams per mole) | 0.1 | 0.0 | 18.73 |
| Polyol (trimethylolpropane) | 0.9 | 0.0 | 18.76 |
| Polymeric MDI | | 1.0 | 62.5 |

Persons skilled in the art will appreciate that the ratio of components as shown in Table 2 is such that there is one isocyanate equivalent of polymeric MDI for one hydroxyl equivalent, with the hydroxyl equivalent representing the total of the hydroxyl groups contributed by the KM-10-1667 carbonate diol and the hydroxyl groups contributed by the trimethylolpropane low molecular weight polyol.

More particularly 18.73 grams of KM-10-1667 carbonate diol, 18.76 grams trimethylolpropane low molecular weight polyol, and 62.5 grams polymeric MDI were blended and mixed in 300 grams of diacetone alcohol solvent to form a 25% solids content solution which was reacted for 2 hours. After 2 hours, 600 grams of diacetone alcohol was added to dilute to a 10% solids content, along with 0.01 grams dibutyltindilaurate as a catalyst and 0.05 grams of FC430 as a surfactant were blended until thoroughly mixed to form a metal oxide primer composition.

A substrate of Lexan™, a polycarbonate material available from General Electric of Pittsfield, Mass.; measuring about 6 feet in length by about 4 feet in width by about ½ inch thick was cleaned by wiping with hexane and a lint free cloth followed by cleaning with methanol and wiping with a lint free cloth. The metal oxide primer composition was flow-coated to a thickness of about 2 microns onto the cleaned Lexan™ substrate and cured for two hours at 230° F. (110° C.) in air to form a metal oxide primer on the Lexan™ substrate. The metal oxide primer had a molecular weight per crosslink of 340.3 g/mole, a molecular weight between branch points of 228 g/mole and a urethane content of 27.5% by weight. The refractive index of the metal oxide primer was 1.5855 which nearly matched the refractive index of the Lexan™ substrate which was about 1.5850. The metal oxide primer exhibited a glass transition temperature of 248° F. (120° C.) as measured by a Torsional Braid Analyzer manufactured by Plastics Instruments, Inc. of Princeton, N.J.

A 10 ohms/square resistance coating of indium/tin oxide was applied by magnetic sputtering vacuum deposition (MSVD)to the primed substrate at a substrate temperature of 180° F. (82.2° C.). The thickness of the indium/tin oxide coating was 7500 Angstroms.

The substrate/metal oxide primer/metal oxide coating article thus formed was subjected to a 5-day 176° F. (80° C.) 100% humidity Cleveland Condensing Cabinet Humidity Test and was checked for cracking on a daily basis by cutting samples and conducting visual and microscopic inspection of the samples. No cracking of the metal oxide coating was observed during the 5-day 176° F. (80° C.) 100% humidity Cleveland Condensing Cabinet Humidity Test, showing that the metal primer of the present invention maintained the mechanical integrity and adhesion of the metal oxide coating to the substrate.

COMPARATIVE EXAMPLE 1

The following Comparative Example 1 demonstrates that where a substrate is coated with a metal oxide primer and metal oxide coating, wherein the polymeric MDI of the metal oxide primer of the instant invention is replaced entirely by an all-aliphatic substitute (a known crosslinking agent, but having an index of refraction which does not match the refractive index of the substrate), the resultant comparative metal oxide primer did not prevent the metal oxide coating from buckling and cracking. The comparative metal oxide primer results in cracking of the metal oxide coating as it cools to room temperature from the temperature at which the metal oxide coating was applied of about 180° F. (82.2° C.).

13.53 g of KM-10-1667 carbonate diol was mixed with 13.55 g trimethylolpropane low molecular weight polyol and 72.92 g of an all-aliphatic substitute, namely triisocyanurate of hexanediisocyanate available under the trade name Desmodur 3300 available from Bayer of Pittsburgh, Pa. A 25% solids content solution of the above carbonate diol, polyol and all-aliphatic substitute was made in diacetone alcohol. 300 ppm dibutyltindilaurate by weight of solids content in the comparative primer composition was added as a catalyst. The reactants were allowed to react for 2 hours at 230° F. (110° C.), then the solution was diluted with diacetone alcohol to a 10% solids content to form a comparative metal oxide primer composition.

The comparative metal oxide primer composition was flow coated onto a bisphenol A polycarbonate substrate and cured for 2 hours at 230° F. (110° C.). An indium/tin oxide coating was vacuum deposited onto the comparative metal oxide primer composition at a thickness of 7500 Å with a resistance of about 10 ohms/sq. and at a substrate temperature of about 180° F. (82.2° C.). The comparative metal oxide primer had a weight % urethane content of 21.4% and a molecular weight per crosslink of 438 grams per mole.

Four hours after cooling to room temperature the indium/tin oxide coating cracked. The comparative metal oxide primer is assumed to have had a coefficient of expansion which was too high whereupon the rate of contraction of the metal oxide primer upon cooling exceeded the strain limit of the indium/tin oxide coating, causing the indium/tin oxide coating to crack.

EXAMPLE 2

In this example, an EHA/AA copolymer was formed (but not crosslinked) as follows. 836.6 grams of EHA and 163.4 grams of AA were added to a 4 liter vessel along with 1000 grams of "Dowanol PM" (1-methoxy-2-propanol) solvent and stirred. 1 gram of azobisisobutyronitrile (AIBN) free radical initiator was added and mixed until all components were dissolved.

The vessel was placed in a 149° F. (65° C.) water bath. Nitrogen was applied above the vessel to prevent oxygen inhibition of the free radical polymerization of the monomers in the vessel. When the temperature in the vessel reached 149° F. (65° C.) the water bath was turned off and ice was added to cool the bath as necessary to maintain the exothermic reaction below 51.6° F. (125° C.). Stirring was continued during the exothermic reaction. When the exotherm was complete, the temperature dropped to 212° F. (100° C.), and the water bath was turned back on to maintain the vessel contents at about 158° F. (70° C.) to continue polymerization for a total of 12 hours, to obtain high conversion of monomer to polymer. Nitrogen flow was continued during the 12 hour polymerization time. The resultant reaction product is a 50% solids content copolymer of EHA/AA in Dowanol PM.

EXAMPLE 3

The copolymer of Example 2 was crosslinked and cured to form a polyurethane primer as follows. To 500 grams of the EHA/AA copolymer of Example 2, was added 114.6 grams Dowanol PM, 156.28 grams diacetone alcohol and 1.74 grams BYK 306 surfactant. The components were mixed thoroughly with an overhead stirrer. 97.25 grams of crosslinking agent ERL-4221 was added and the solution was again stirred until the components were completely dissolved, to form a polyurethane primer composition. No catalyst was added. The R value was calculated to be 0.8.

The polyurethane primer composition was deposited on an indium/tin oxide coating which had been in turn deposited on a metal oxide primer of the instant invention which had in turn been deposited on a bisphenol-A polycarbonate substrate measuring about 6 foot in length by 4 foot in width by ½ inch in thickness (1.8 m×1.2 m×1.25 cm). The polyurethane primer composition was deposited by flow coating to a thickness of about 2 mils, air dried for 30 minutes to 1 hour and cured at 179.6° F. (82° C.) for about 8 hours to crosslink the polyurethane primer composition and to form a polyurethane primer over the indium/tin metal oxide coating.

The polyurethane primer was a tough and rubbery polymer that had good adhesion to the indium/tin oxide surface. A scribe tape test was performed on the primer as described in ASTM D3359-93. No polyurethane primer adhesion failure was observed. After exposing the coated composite to a 3-day 140° F. (60° C.) 100% humidity Cleveland Condensing Cabinet Humidity Test, visual inspection of the polyurethane primer determined that no water pockets were seen at the polyurethane primer/indium tin oxide coating interface. Water pockets, similar in appearance to blisters will form at the metal oxide coating/polyurethane primer interface in the presence of poor adhesion between the metal oxide coating and the polyurethane primer, allowing water to enter the interface and displace the metal oxide coating/polyurethane primer bond.

The sample exposed to the 3-day 140° F. (60° C.) 100% humidity Cleveland Condensing Cabinet Humidity Test was dried for 2 hours at room temperature pursuant to ASTM D3359-93, and the coated composite was again scribe tape tested for adhesion. 100% of the tape test area retained adhesion demonstrating excellent adhesion of the polyurethane primer to the metal oxide coating.

EXAMPLE 4

A polyurethane protective liner was formed and applied over the polyurethane primer of Example 3, (thereby forming a bisphenol-A polycarbonate substrate/metal oxide primer/metal oxide coating/polyurethane primer/polyurethane protective liner composite), as follows.

First, a polyurethane protective liner composition was formed by adding solvent, catalyst, temporary catalyst poison, antioxidant, hindered light amine, ultraviolet stabilizer, polyol and isocyanate as follows. 881.4 grams of cyclohexanone solvent was poured into a one gallon vessel. 36.7 grams of a 1% solution of dibutyltindilaurate in cyclohexanone was added to function as a catalyst. 36.7 grams of acetyl acetone was also added to function as a "temporary catalyst poison" to extend the pot life of the composition in the vessel. The acetyl acetone acted as a temporary catalyst poison by reducing the catalytic activity of the dibutyltindilaurate in the vessel, but evaporated off with the solvent after application of the polyurethane protective liner composition over the polyurethane primer as described below, permitting the dibutyltindilaurate to resume normal catalytic reactivity. 18.4 grams of an antioxidant available from Ciba Geigy Inc., of Ardsley, N.Y., under the trade name Irganox 1076 was added to the vessel. 36.7 grams of a hindered amine light available from Ciba Geigy under the trade name Tinuvin 440 was added to the vessel. 55.0 grams of an ultraviolet light stabilizer available from Sandoz, Inc., of Charlotte, N.C. under the trade name Sandoz 3206 was added to the vessel. The mixture was stirred until complete solution was obtained.

The polyol was added in two parts. First, 1500 grams of carbonate diol polyol available from Stahl, Inc. of Boston, Mass., under the trade name KM-10-1667 was melted at about 176° F. (80° C.) and added in its melted state to the vessel and mixed until a clear solution was obtained. Next, 1000 grams of carbonate diol polyol available from Stahl, Inc. of Boston, Mass., under the trade name KM-10-1733 was melted at about 176° F. (80° C.) and was added in its melted state to the vessel and mixed until a clear solution was obtained. The KM-10-1667 functioned to strengthen the polyurethane protective liner, and the KM-10-1733 functioned to slightly soften the polyurethane protective liner.

The above mixture was cooled to room temperature and 1172.35 grams of an isocyanate, specifically a triisocyanate available from Bayer Inc., of Pittsburgh, Pa. under the trade name Desmodur 3390 was added to the vessel and mixed until a clear solution was obtained having a viscosity at about 77° F. (25° C.) of about 1200 centipoise, to form a polyurethane protective liner composition. The equivalent weights of the polyols and isocyanate reactive components in the polyurethane protective liner composition are as set forth in Table 3 below:

TABLE 3

| Component | Equivalent Weight |
| --- | --- |
| KM-10-1733 | 443.86 grams/equivalent |
| KM-10-1667 | 474.38 grams/equivalent |
| Desmodur 3390 | 216.5 grams/equivalent |

The polyurethane protective liner composition was allowed to react for about 2 hours until the viscosity reached about 1500 centipoise at room temperature.

The polyurethane protective liner composition was applied over the polyurethane primer of Example 3. The polyurethane protective liner composition was applied by flow coating to a thickness of about 4 mils. The polyurethane protective liner was allowed to air dry until tack free, which was approximately 4 hours. The substrate coated as described, hereinafter "the article" was then placed in an air circulating oven and cured at 180° F. (82.2° C.) for approximately 4 hours to form a polyurethane protective liner over the polyurethane primer.

A sample approximately 4" by 4" (10.16 cm by 10.16 cm) of the article was cut, and abrasion resistance was measured on a Taber Abraser. The Taber Abraser is a device known in the art in which a turntable rotates beneath an abrasive pad attached to a mechanical arm. A sample is placed in the turntable and the table is caused to rotate causing the abrasive pad to abrade the sample. One revolution of the turntable is one cycle. The measurement revealed an increase in haze after 1000 cycles of abrasion of about 7%. Haze was measured by a Haze Gard, Model XL211, manufactured by Pacific Scientific Corp. of Newport Beach, Calif.

An additional sample of the article was subjected to scribe tape test according to ASTM D3359-93. No coating failure was observed.

A sample of the article was subjected to a 140° F. (60° C.) 100% humidity Cleveland Condensing Cabinet Humidity Test for about 6 months. Visual inspection once a week for the 6 month period for water pockets at the polyurethane primer/metal oxide coating interface showed none.

A sample of the article subjected to the 6 month 140° F. (60° C.) 100% humidity Cleveland Condensing Cabinet Humidity Test was dried for about 2 hours at room temperature, and the scribe tape test for adhesion was again performed pursuant to ASTM D3359-93. 80% of the tape test area retained adhesion demonstrating the excellent adhesion of the polyurethane protective liner to he polyurethane primer, and excellent adhesion of the polyurethane primer to the metal oxide coating.

COMPARATIVE EXAMPLE 2

The same polyurethane protective liner described in Example 4 was applied to an article as described in Example 4, except that the article of this comparative example did not include a polyurethane primer, and therefore, the polyurethane protective liner was applied directly over the metal oxide coating.

A sample of the article of Comparative Example 2 was subjected to the scribe tape test according to ASTM D3359-93, which resulted in 100% removal of the polyurethane protective liner from the scribed area demonstrating the poor adhesion of the polyurethane protective liner to the metal oxide coating.

Another sample of the article of Comparative Example 2 was subjected to a 24 hour 140° F. (60° C.) 100% humidity Cleveland Condensing Cabinet Humidity Test. Upon visual inspection after testing, many undesirable water pockets were visible at the polyurethane protective liner/metal oxide coating interface, indicating poor polyurethane protective liner adhesion to the metal oxide coating in the absence of the polyurethane primer of the instant invention.

The sample subjected to the 24 hour 140° F. (60° C.) 100% humidity Cleveland Condensing Cabinet Humidity Test was dried for two hours at room temperature, and the article was again subjected to the scribe tape test for adhesion as described in ASTM D3359-93. The test results showed 100% adhesion loss, demonstrating the efficacy of the polyurethane primer.

Another sample of the article of Comparative Example 2 was tested on the Taber Abraser for abrasion resistance. After 100 cycles, the test was stopped as the polyurethane protective liner was completely removed from the metal oxide coating, demonstrating the poor adhesion of the polyurethane protective liner to the metal oxide coating in the absence of the primer of the instant invention.

The above examples are offered to illustrate the present invention and are not intended to limit the invention. Various modifications are included within the scope of the invention, which is defined by the following claims.

We claim:

1. An aircraft transparency comprising:
   a. a substrate having a pair of opposed major surfaces;
   b. an electroconductive metal oxide coating disposed over at least one of the major surfaces of said substrate; and
   c. a primer comprising a carbonate diol-based crosslinked polyurethane for adhering said metal oxide coating to the at least one of the major surfaces of said substrate.

2. The aircraft transparency of claim 1 further comprising:
   a. a polyurethane protective liner disposed over said electroconductive metal oxide coating; and
   b. a primer comprising a reaction product of a crosslinking agent and a polymer selected from the group consisting of a copolymer of 2-ethylhexylacrylate and acrylic acid, a copolymer of cyanoethylacrylate and acrylic acid and a terpolymer of cyanoethylacrylate, 2-ethylhexylacrylate and acrylic acid adhering said metal oxide coating and said polyurethane protective liner together.

3. The aircraft transparency of claim 2 further comprising a second polyurethane protective liner on the other one of the major surfaces of said substrate.

4. The aircraft transparency of claim 1 wherein said substrate is a transparent substrate selected from the group consisting of polycarbonate polyurethane, bisphenol-A polycarbonate, polyether polycarbonate and stretched acrylic.

5. The aircraft transparency of claim 1 wherein the electroconductive metal oxide coating is selected from the group consisting of indium oxide, tin oxide and mixtures thereof.

6. The aircraft transparency of claim 5 wherein the electroconductive metal oxide coating is an indium/tin oxide coating.

7. The aircraft transparency of claim 6 wherein the ratio of indium oxide to tin oxide is about 9:1.

8. The aircraft transparency of claim 7 wherein said electroconductive metal oxide coating has a resistance of about 3 to 40,000 ohms/square and a thickness of about 1400 to 13,000 Angstroms.

9. The aircraft transparency of claim 1 wherein said metal oxide primer is about 0.5 to 10 microns thick.

10. The aircraft transparency of claim 1 wherein said metal oxide primer has a glass transition temperature of at least 230° F. (110° C.).

11. The aircraft transparency of claim 1 wherein said metal oxide primer has a molecular weight per crosslink of about 276 to 411 grams per mole.

12. The aircraft transparency of claim 1 wherein said metal oxide primer has a urethane content of about 24 to 32 weight percent.

13. The aircraft transparency of claim 1 wherein said metal oxide primer has a refractive index that is ±2% of the refractive index of the substrate.

14. The aircraft transparency of claim 1 wherein said metal oxide primer has a refractive index between about 1.5555 and 1.6155.

15. The aircraft transparency of claim 1 wherein said metal oxide primer has a coefficient of expansion between the coefficient of expansion of the substrate and the coefficient of expansion of the electroconductive metal oxide coating.

16. The aircraft transparency of claim 1 wherein said metal oxide primer maintains said adherence when said transparency is subjected to temperatures between −65° F. (−53.8° C.) and +230° F. (110° C.).

17. The aircraft transparency of claim 1 wherein said metal oxide primer enables said electroconductive metal oxide coating to withstand a strain of up to 1% without buckling or cracking of said electroconductive metal oxide coating.

18. The aircraft transparency of claim 1 wherein said metal oxide primer is a reaction product of a carbonate diol, a low molecular weight polyol and polymeric methylenediisocyanate.

19. The aircraft transparency of claim 18 wherein said carbonate diol is selected from the group consisting of hexanediol-based carbonate diols, hexanediol-cyclohexanedimethanol-based carbonate diols and mixtures thereof.

20. The aircraft transparency of claim 19 wherein said carbonate diol is selected from compounds having the general formula:

where a is an integer from 2 to 9, preferably 4, and where each R group is independently —(CH$_2$)$_b$—, where b is an integer from 2 to 8, preferably 6, or 21. The aircraft transparency of claim 18 wherein said low molecular weight polyol has a molecular weight of less than about 300 grams per mole.

22. The aircraft transparency of claim 18 wherein said low molecular weight polyol is selected from compounds of the general formula:

where f is an integer from 4–18 and g is an integer from 3–12.

23. The aircraft transparency of claim 18 wherein said low molecular weight polyol is selected from the group consisting of trimethyolpropane and pentaerythritol.

24. The aircraft transparency of claim 18 wherein said polymeric methylenediisocyanate is selected from compounds of the general formula:

wherein the NCO groups and methylene groups may be in any position on a phenyl ring provided that no NCO group and methylene group occupy the same position the same phenyl ring.

25. The aircraft transparency of claim 18 wherein said reaction product is formed from a reaction of about 0.9 to about 1.1 hydroxyl equivalents of the combined total of hydroxyl equivalents provided by the carbonate diol and by the low molecular weight polyol with 1 equivalent of NCO groups provided by the methylenediisocyanate.

26. The aircraft transparency of claim 25 wherein said about 0.9 to 1.1 total hydroxyl equivalents provided by the carbonate diol and by the low molecular weight polyol includes about 0.05 to 0.15 hydroxyl equivalents provided by the carbonate diol, with the balance hydroxyl equivalents provided by the low molecular weight polyol.

27. The aircraft transparency of claim 2 wherein said polyurethane primer includes the reaction product of a crosslinking agent and a copolymer including 2-ethylhexylacrylate and acrylic acid.

28. The aircraft transparency of claim 27 wherein the mole ratio of said 2-ethylhexylacrylate to said acrylic acid in said copolymer is within the range of 3:1 to 1:3.

29. The aircraft transparency of claim 28 wherein the mole ratio of 2-ethylhexylacrylate to acrylic acid in said copolymer is 2:1.

30. The aircraft transparency of claim 29 wherein the polyurethane primer has a glass transition temperature after crosslinking of about 55° C. (131° F.).

31. The aircraft transparency of claim 2 wherein said polyurethane primer includes the reaction product of a crosslinking agent and a copolymer including cyanoethylacrylate and acrylic acid wherein the mole ratio of cyanoethylacrylate to acrylic acid is about 3:1 to 1:3.

32. The aircraft transparency of claim 2 wherein said polyurethane primer includes the reaction product of a terpolymer including 2-ethylhexylacrylate, cyanoethylacrylate and acrylic acid wherein the mole ratio of cyanoethylacrylate to 2-ethylhexylacrylate to acrylic acid is about 1:2:1 to 0.5:0.5:3.

33. The aircraft transparency of claim 2 wherein the crosslinking agent is selected from compounds of the general formula:

where h is 0 or 1 and i is an integer from 2 to 6.

34. The aircraft transparency of claim 33 wherein the crosslinking agent is selected from the group consisting of 3,4-epoxycyclohexylmethyl-3,4-epoxycyclohexane carboxylate and bis(3,4-epoxycyclohexyl) adipate.

35. The aircraft transparency of claim 2 wherein the thickness of said polyurethane primer is about 0.25 to 3 mils.

36. The aircraft transparency of claim 2 wherein the thickness of said polyurethane protective liner is about 1 mil to 5 mils.

37. The aircraft transparency of claim 2 wherein the polyurethane protective liner is a crosslinked thermoset polycarbonate polyurethane.

38. The aircraft transparency of claim 37 wherein the polyurethane protective liner has a molecular weight per crosslink of about 500 to 10,000 grams per mole.

39. The aircraft transparency of claim 37 wherein the polyurethane protective liner has a molecular weight between branch points of about 1279 grams per mole.

40. The aircraft transparency of claim 2 wherein the polyurethane protective liner has a urethane content of about 3 to 30 percent.

41. An aircraft transparency comprising:
   a. a substrate having a pair of opposed major surfaces;
   b. an electroconductive metal oxide coating disposed over at least one of the major surfaces of said substrate;
   c. a polyurethane protective liner disposed over said electroconductive metal oxide coating; and
   d. a primer comprising a reaction product of a crosslinking agent and a polymer selected from the group consisting of a copolymer of 2-ethylhexylacrylate and acrylic acid, a copolymer of cyanoethylacrylate and acrylic acid, and a terpolymer of cyanoethylacrylate, 2-ethylhexylacrylate and acrylic acid adhering said metal oxide coating and said polyurethane protective liner together.

42. The aircraft transparency of claim 41 further comprising a second polyurethane protective liner on the other one of the major surfaces of said substrate.

43. The aircraft transparency of claim 41 wherein the mole ratio of said 2-ethylhexylacrylate to said acrylic acid in said copolymer is within the range of 3:1 to 1:3.

44. The aircraft transparency of claim 43 wherein the polyurethane primer has a glass transition temperature after crosslinking of about 55° C. (131° F.).

45. The aircraft transparency of claim 41 wherein said polyurethane primer includes the reaction product of a crosslinking agent and a copolymer including cyanoethylacrylate and acrylic acid wherein the mole ratio of cyanoethylacrylate to acrylic acid is about 3:1 to 1:3.

46. The aircraft transparency of claim 41 wherein said polyurethane primer includes the reaction product of a terpolymer including 2-ethylhexylacrylate, cyanoethylacrylate and acrylic acid wherein the mole ratio of cyanoethylacrylate to 2-ethylhexylacrylate to acrylic acid is about 1:2:1 to 0.5:0.5:3.

47. The aircraft transparency of claim 41 wherein the crosslinking agent is selected from compounds of the general formula:

where h is 0 or 1 and i is an integer from 2 to 6.

48. The aircraft transparency of claim 41 wherein the thickness of said polyurethane primer is about 0.25 to 3 mils.

49. The aircraft transparency of claim 41 wherein the thickness of said polyurethane protective liner is about 1 mil to 5 mils.

50. The aircraft transparency of claim 41 wherein the electroconductive metal oxide coating is selected from the group consisting of indium oxide, tin oxide and mixtures thereof.

51. The aircraft transparency of claim 41 wherein said substrate is a transparent substrate selected from the group consisting of polycarbonate polyurethane, bisphenol-A polycarbonate, polyether polycarbonate and stretched acrylic.

\* \* \* \* \*